(12) United States Patent
Berger

(10) Patent No.: US 10,737,713 B1
(45) Date of Patent: Aug. 11, 2020

(54) LIFT ASSIST FOR INSTALLING AND REMOVING HEAVY BULKY OBJECTS

(71) Applicant: Darrell G Berger, Schulenburg, TX (US)

(72) Inventor: Darrell G Berger, Schulenburg, TX (US)

(*) Notice: Subject to any disclaimer, the term of this patent is extended or adjusted under 35 U.S.C. 154(b) by 1 day.

(21) Appl. No.: 15/486,303

(22) Filed: Apr. 13, 2017

Related U.S. Application Data

(60) Provisional application No. 62/323,774, filed on Apr. 17, 2016.

(51) Int. Cl.
*B62B 3/04* (2006.01)
*B62B 3/02* (2006.01)
*B62B 5/06* (2006.01)

(52) U.S. Cl.
CPC ............ *B62B 3/04* (2013.01); *B62B 3/02* (2013.01); *B62B 5/06* (2013.01); *B62B 2202/10* (2013.01); *B62B 2206/06* (2013.01)

(58) Field of Classification Search
CPC .... B62B 3/04; B62B 3/02; B62B 3/06; B62B 3/006; B62B 2203/60; B62B 3/08; B62B 2206/06; B66F 5/00; B66F 7/00; B66F 9/00; B25H 1/0021
USPC ............... 269/17; 280/47.34, 79.11
See application file for complete search history.

(56) References Cited

U.S. PATENT DOCUMENTS

| | | | | |
|---|---|---|---|---|
| 3,667,728 A | * | 6/1972 | Garelick | B62B 1/14 254/8 R |
| 5,797,503 A | * | 8/1998 | Stevens | A47B 31/00 108/107 |
| 2003/0030239 A1 | * | 2/2003 | Woerner | B62B 3/002 280/47.35 |

* cited by examiner

*Primary Examiner* — Tyrone V Hall, Jr.
*Assistant Examiner* — Abbie E Quann
(74) *Attorney, Agent, or Firm* — James R Bell; Mark P Kahler

(57) ABSTRACT

A portable lift device for installing and removing heavy, bulky objects. The device comprises a portable cart having a low-profile base, wheels mounted on the base, and a push handle extending from the base. At least one spacer may rest on and extend above the base, whereby the low profile of the base is elevated. A receiver is mounted on the base. The receiver includes a plurality of support recesses. A workstick is pivotably engageable with a selected one of the support recesses, the workstick having a chain attachment member. A chain is provided to be attachable to the chain attachment member and also attachable to a unit to be lifted in response to movement of the workstick.

11 Claims, 4 Drawing Sheets

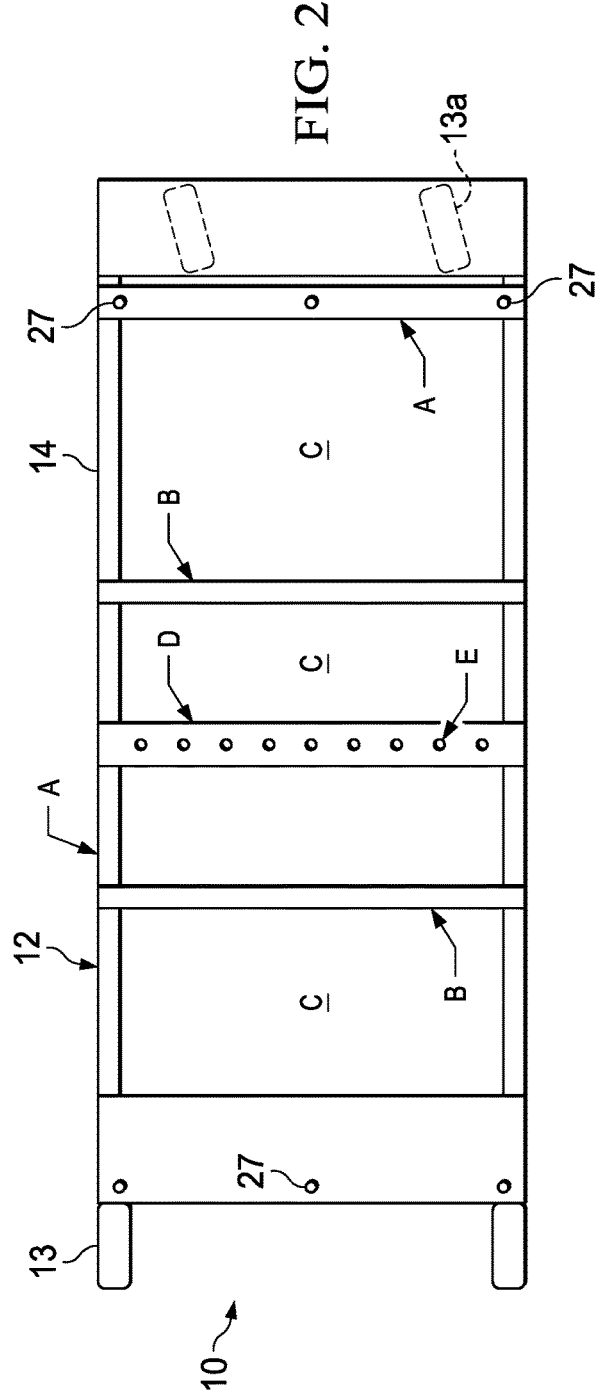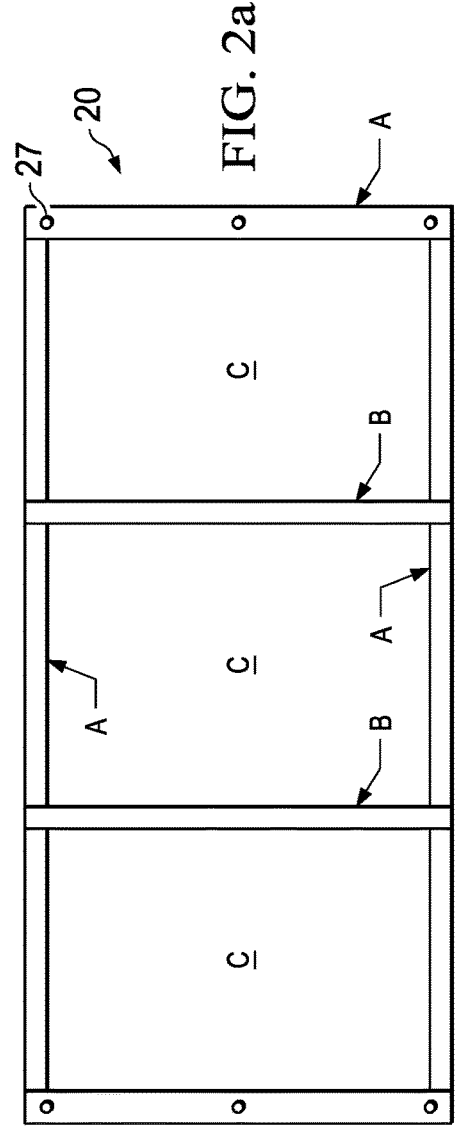

LIFT ASSIST FOR INSTALLING AND REMOVING HEAVY BULKY OBJECTS

CROSS REFERENCE TO RELATED APPLICATIONS

This application is related to and claims priority to U.S. Provisional application No. 62/323,774, filed Apr. 17, 2016.

BACKGROUND

This disclosure relates generally to a lift assist for installing and removing heavy bulky objects and more particularly to a portable and height adjustable lift device.

The installation and removal of a wall mounted air conditioning unit is difficult due to the bulky size and weight of each unit (about 100 lbs.). As a result, such installation and removal is not considered to be a one-person job. Furthermore, it is a difficult task for two people to handle. Therefore, it would be beneficial to provide a means to overcome the difficulties of this task and enable an individual to accomplish the installation and removal without requiring additional personnel.

SUMMARY

Accordingly, a solution is proposed which includes a lift assist device for installing and removing heavy bulky objects. The device comprises a portable cart having a low profile base, wheels mounted on the base, and a push handle extending from the base. At least one spacer may rest on and extend above the base, whereby the low profile of the base is elevated. A workstick receiver is mounted on the base. The receiver includes a plurality of workstick receiving recesses. A workstick is pivotably engageable with a selected one of the recesses, the workstick including a chain attachment member. A chain is provided to be attachable to the chain attachment member of the workstick and also attachable to a unit to be lifted in response to movement of the workstick.

BRIEF DESCRIPTION OF THE DRAWINGS

FIGS. 2 and 2a are top views illustrating an embodiment of the cart and spacer, respectively, of this disclosure.

DETAILED DESCRIPTION

Figure 1:
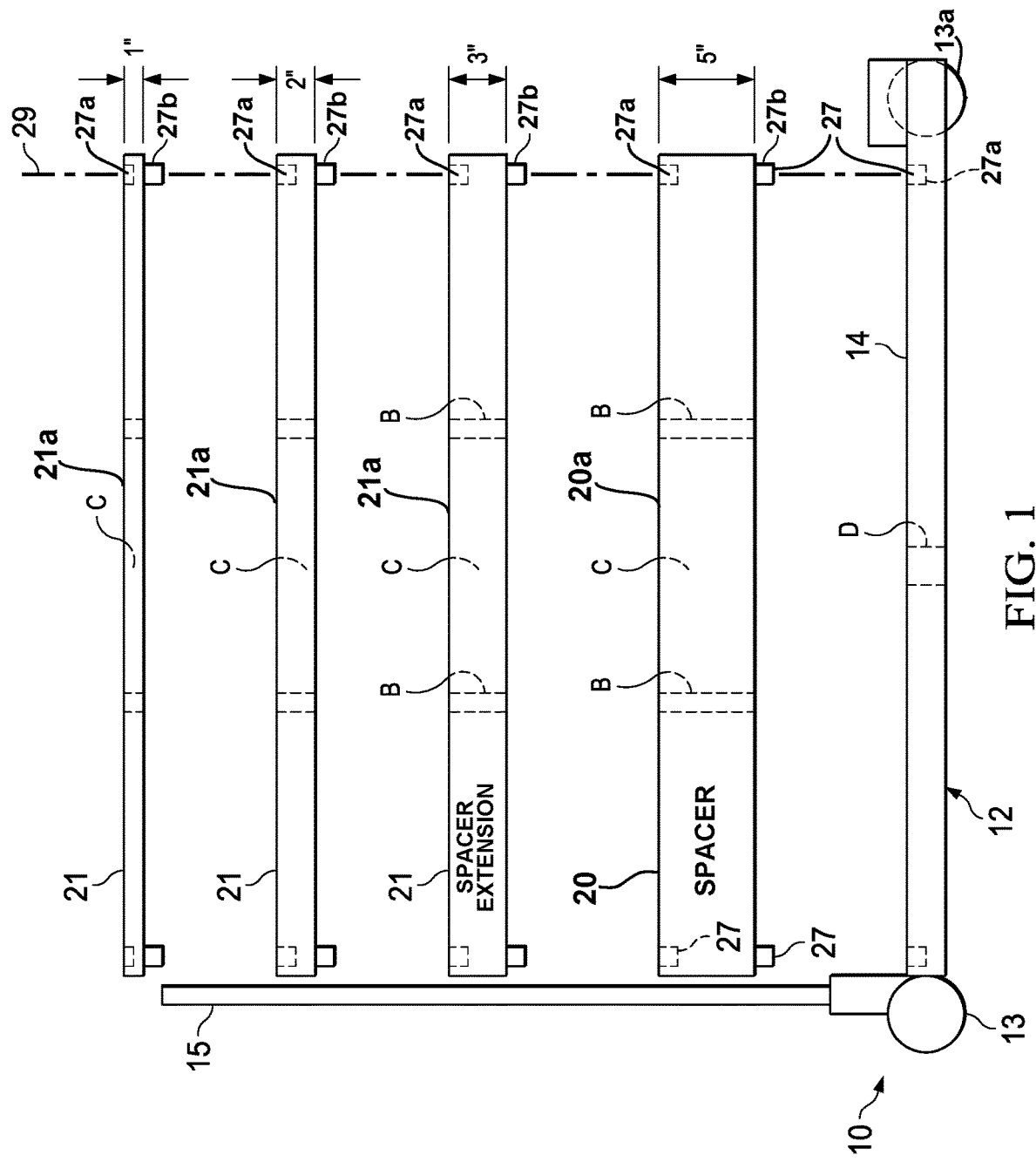
FIG. 1 is an exploded side view illustrating an embodiment of the cart, the spacer and spacer extensions of this disclosure.

A lift assist device 10, FIGS. 1 and 2, is provided for installing and removing heavy bulky objects so that installing and removing can be accomplished by a one person. The device 10 generally is in the form of a heavy-duty pushcart 12 including a low profile base 14 on wheels or casters 13 and swivel casters 13a for portability, and further includes a push handle 15 extending upwardly from the base 14.

The low profile base 14 of the cart 12 has a support height of 3" above floor level, and therefore a means of height adjustment is needed to position an elevated base at a desired support height above base 14. An embodiment includes a spacer 20 having a height of 5". Therefore, when spacer 20 is mounted on base 14, the support height of the elevated base is 8" above floor level. The spacer 20 thus provides a raised surface 20a atop of which the heavy bulky object may rest during installation or removal of the object. The spacer 20, FIG. 2a, is attachable to base 14 and can be secured to base 14 by connectors which may include suitable fasteners or a preferred quick-connect snap-in connector 27 of which connector portion 27b is situated on the bottom of spacer 20, and of which connector portion 27a is situated on the base 14.

If more than an 8" elevation above floor level is needed, additional spacer extensions 21 may be used as will be discussed below. Such spacer extensions can have heights of 1", 2" or 3", and can have the same construction as the spacer 20, or may have a modified version of spacer 20, e.g. can have fewer cross members. If spacer extensions 21 are used, such extensions can have heights of 1", 2" or 3" so that a combination of support heights can be achieved by adding different extensions 21 in an aligned stacked array, see the alignment along line 29, FIG. 1, until the desired support height above floor level is achieved, or at least is approximated. Spacer 21a provides a raised surface 21a atop of which the heavy bulky object may rest during installation or removal of the object.

The cart 12 is illustrated in a side view in FIG. 1 and a top view in FIG. 2. The 3" base 14 is supported by casters 13 and 13a so that the cart 12 is portable. The handle 15 of cart 12 extends vertically from base 14 so that the cart 12 can be easily maneuvered. The base 14 is not a solid base but is formed in a picture frame-like structure including peripheral members A and cross members B. These interconnected members A and B define open spaces C. A receiver member D is also included in the base 14. A workstick receiver D includes a plurality of recesses E (i.e. openings) that can receive an end of the workstick, to be discussed below. The workstick receiver D is always exposed in an open space C when spacers 20 or extensions 21 are mounted on base 14.

In FIG. 1, when either the spacer 20 or extensions 21, or a combination of spacer 20 and extensions 21 are stacked to establish a desired support height, stability of the stacked array is required in order to support the heavy, bulky object, to be further discussed below. Such stability can be achieved by fastening together the stacked spacer 20 and/or extensions 21. As mentioned above, suitable fasteners 27, such as screws, clamps or snap-in members may be used. Such fasteners 27 may be positioned on mating peripheral members A, cross-members B, or both. For example, in FIG. 2, fasteners 27 are positioned on the base 14 and on the spacer 20. When stacked, the cross members B of spacer 20 and extensions 21 are aligned with cross members B of base 14.

The spacer 20 can be formed of suitable structural members such as channel members and angle members and can be formed of a suitable metal or a suitable synthetic material.

Figure 3:
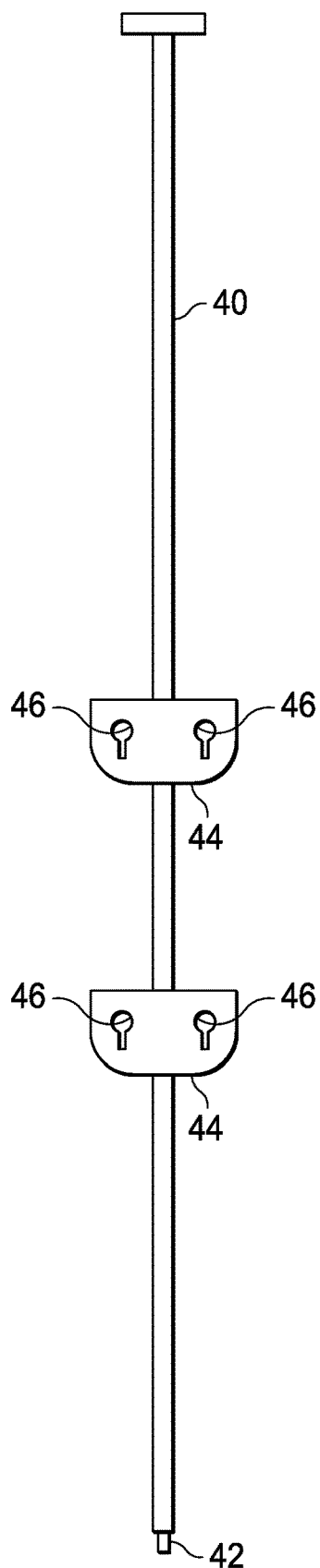
FIG. 3 is a frontal view illustrating an embodiment of the work stick device of this disclosure.
Figure 4:
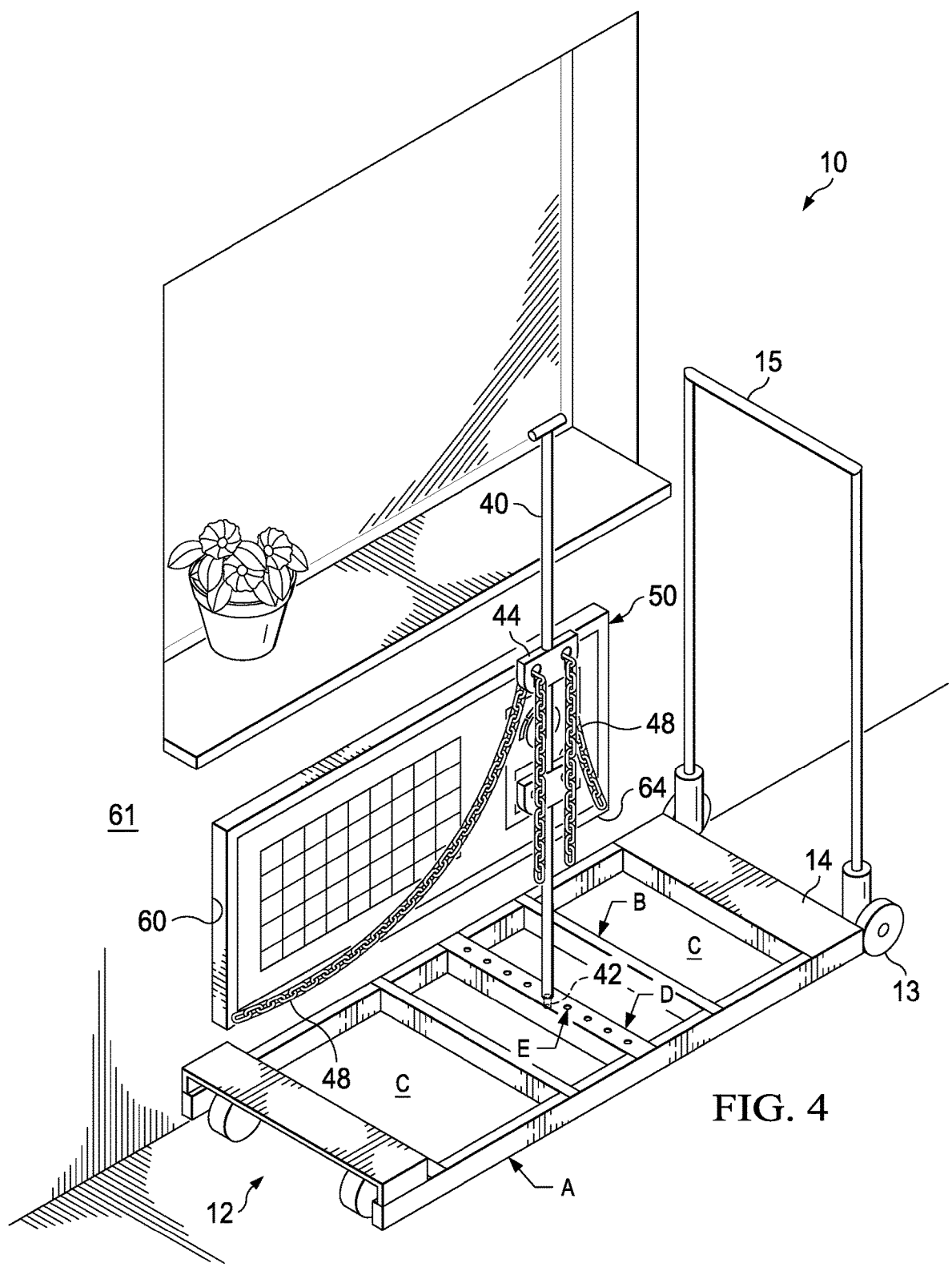
FIG. 4 is a perspective view illustrating an embodiment of the workstick used with the cart and lift chains this disclosure.

The receiver is mounted in the base 14, FIGS. 2, 3 and 4, in the form of an elongated bar D extending transverse to the longitudinal axis of the base 14. The bar D includes a plurality of support recesses E extending in a row along the length of the bar D. A workstick 40, FIGS. 3 and 4, extends to a terminal studded end 42. Also, workstick 40 includes a chain attachment member 44. The chain attachment member 44 includes a pair of slots 46 for removably engaging a selected link of a chain. The terminal studded end 42 of workstick 40 is pivotably engageable with a selected one of the recesses E as will be explained below.

A chain 48 or a pair of chains FIG. 4, are adjustably attachable to the slots 46 of the chain attachment member 44 of the workstick 40. The chain or pair of chains 48 are also attachable to a unit 50 to be lifted in response to movement of the workstick 40 as is described in more detail below.

In FIG. 4, an opening 60 is provided in a wall 61 in order to receive an air conditioning (AC) unit 50 such as is commonly done in residences, motels, and various buildings. The cart 12 is moved to position AC unit 50 adjacent the opening 60. The bottom surface 64 of the AC unit 50 is even with or very slightly higher than the surface 14 of cart 12 or a surface of spacer 20. In this position, AC unit 50 can be slid manually from cart 12 into the opening 60, even by one person. Alternately, the workstick 40 may be used as a pry bar by inserting end 42 in a selected recess E and then urging the workstick 40 against the AC unit 50 and urging the unit 50 into the opening 60 without the use of chains 48.

For removal, FIG. 4, extraction of AC unit 50 from opening 60 is easily accomplished by one person by again moving the cart device 12 adjacent the wall opening 60 so that the base 14 or spacer 20 or spacer extension 21 are equal to or substantially equal to the bottom 64 of the AC unit 50. The workstick 40 is then inserted into an appropriate one of the recesses (i.e. openings) E in bar D. The chains 48 are then clamped onto a bottom surface of the AC unit 50 and engaged with little or no slack in slots 46 in chain attachment member 44. A pivotal movement of workstick 40, in a direction away from wall 61, will apply a substantially even tension on chains 48 and simultaneously pull AC unit 50 from opening 60 with a slight lifting force. Thus, AC unit 50 is easily slid onto the cart 12.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A lift assist device comprising:
   a portable cart including a low profile base, wheels mounted on the base, and a push handle extending from the base;
   a workstick receiver mounted on the base, the workstick receiver including a plurality of workstick receiving recesses;
   a spacer member situated atop the base and the workstick receiver, the spacer member exhibiting a frame geometry including an open space therein, the spacer member further exhibiting a first height;
   a workstick pivotably engageable with a selected one of the workstick receiving recesses when an end of the workstick is situated to rest in the selected one of the workstick receiving recesses, the workstick being situated to pass through the open space of the spacer member to engage the selected one of the workstick receiving recesses, the workstick including a chain attachment member; and
   a chain attachable to the chain attachment member and attachable to a unit to be moved relative to the base in response to pivoting movement of the workstick about the selected one of the workstick receiving recesses.

2. The lift assist device of claim 1, further comprising interconnectable fastener members provided, respectively, on the spacer member and the base below to hold the spacer member to the base below in an aligned relationship therewith.

3. The lift assist device of claim 1, wherein the chain is length adjustable and attachable to the chain attachment member of the workstick via a multi-slotted receiver provided in the chain attachment member of the workstick.

4. The lift assist device of claim 1, wherein the workstick includes opposed ends and the chain attachment member is located in a region of the workstick between the opposed ends of the workstick.

5. The lift assist device of claim 1, further comprising a first spacer extension member situated atop the spacer member, the first spacer extension member exhibiting a frame geometry with an open space therein, wherein the workstick is situated to pass through the open space of the first spacer extension member and further through the open space of the spacer member to engage the selected one of the workstick receiving recesses, the first spacer extension member exhibiting a second height, wherein the first spacer extension member provides a raised surface for the unit to be moved to rest.

6. The lift assist device of claim 5, further comprising a second spacer extension member situated atop the first spacer extension member, the second spacer extension member exhibiting a frame geometry with an open space therein, wherein the workstick is situated to pass through the open space of the second spacer extension member, through the open space of the first spacer extension member and further through the open space of the spacer member to engage the selected one of the workstick receiving recesses, the second spacer extension member exhibiting a third height, wherein the second spacer extension member provides a raised surface for the unit to be moved to rest.

7. The lift assist device of claim 6, wherein the first and second heights are different.

8. The lift assist device of claim 6, wherein the first, second and third heights are different.

9. The lift assist device of claim 5, wherein the first spacer extension member is stackable atop the spacer member.

10. The lift assist device of claim 6, wherein the second spacer extension member is stackable atop the first spacer extension member.

11. The lift assist device of claim 5, further comprising interconnectable fastener members provided, respectively, on the first spacer extension member and the spacer member below to hold the first spacer extension member to the spacer member below in an aligned relationship therewith.

\* \* \* \* \*